B. F. CHILDRESS.
COFFEE PERCOLATOR.
APPLICATION FILED SEPT. 17, 1913.
1,146,922.
Patented July 20, 1915.
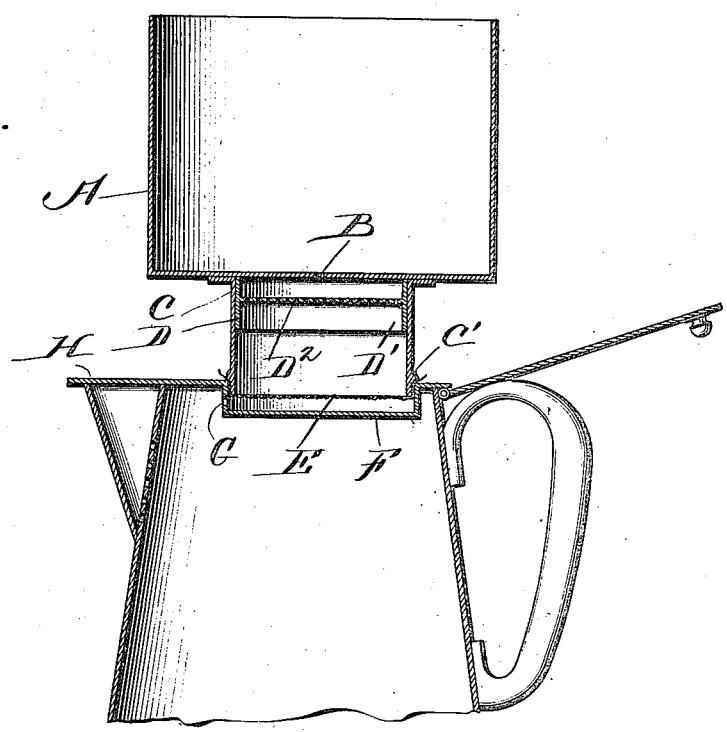
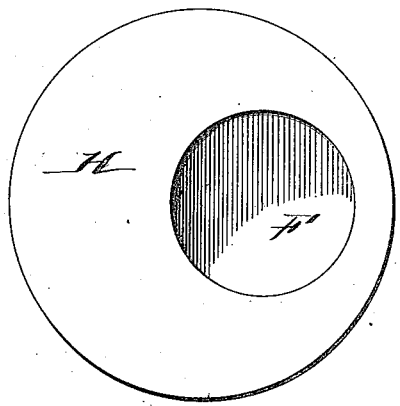

UNITED STATES PATENT OFFICE.

BENJAMIN F. CHILDRESS, OF LYNCHBURG, VIRGINIA.

COFFEE-PERCOLATOR.

1,146,922.  Specification of Letters Patent.  Patented July 20, 1915.

Application filed September 17, 1913. Serial No. 790,334.

*To all whom it may concern:*

Be it known that I, BENJAMIN F. CHILDRESS, a citizen of the United States, residing at Lynchburg, in the county of Campbell and State of Virginia, have invented a new and useful Improvement in Coffee-Percolators, of which the following is a specification.

This invention relates generally to coffee pots and more particularly to that class thereof known as percolators.

The object of my invention is to provide an exceedingly cheap and simple construction of percolator and one which will be highly efficient and overcome numerous objections found in the present type of percolators.

So far as I am aware the percolators now in use require considerable time and heat to properly make a given quantity of coffee, and furthermore it is almost impossible to make a small quantity of coffee, and in that class of percolators where boiling water is poured through it is almost impossible to extract the full strength of the coffee by the single passage of water therethrough.

My improved form of percolator is intended to remedy this and other defects, and with these objects in view my invention consists in the novel features of construction, combination and arrangement all of which will be fully described hereinafter and pointed out in the claims.

In the drawings forming a part of this specification, Figure 1 is a vertical section showing the parts in position for use. Fig. 2 is a plan view of a supporting flange.

In the practical embodiment of my invention it will of course be understood that it can be made of any suitable material and will be made in varying sizes, each size being capable of producing a minimum or maximum of coffee within given limits.

My percolator consists first, of a receptacle A, preferably cylindrical in shape, open at the top, and having a single opening B in the bottom thereof, this opening being about one-sixteenth or one thirty-second of an inch in diameter.

Attached to the bottom of the receptacle A by soldering, riveting or brazing is a cylindrical sleeve C which is open at the lower end as shown and a short distant above this end the sleeve is provided with a bead or crimp C'. Fitting into the sleeve C is a water distributer D consisting of a ring D' carrying a perforated plate or diaphragm $D^2$, this plate or diaphragm having a series of perforations produced therein, each perforation being slightly less in diameter than the opening or perforation B in the bottom of the receptacle A. The ring of the water distributer is of such thickness that when the said distributer is pushed up into the sleeve until it contacts with the bottom of the receptacle A, it will hold the perforated plate or diaphragm a short distance below the bottom of the receptacle A.

The boiling water which is poured into the receptacle A will pass slightly through the opening B down upon the perforated plate of the water distributer and will be distributed evenly by means of this plate upon the ground coffee which is placed within the sleeve C beneath the water distributer and held there by means of a piece of gauze E stretched across the lower end of the sleeve C and held in such stretched position by fitting the lower end of the sleeve into the coffee receiving vessel F, the rigid bead or crimp upon the sleeve serving as a stop to limit the telescoping action of these parts. The coffee receiving vessel F is preferably cylindrical in form and is made with an imperforate bottom as shown at one point in the side of this vessel is an opening G preferably from one-eighth to one-fourth of an inch above the bottom and this opening is of a size greater than the opening B in the bottom of the water receiving vessel.

The coffee receiving vessel is adapted to be inserted always in the top of a coffee pot or other spouted vessel and is held there or supported therein by means of a flange H rigidly attached to the coffee receiving vessel F and extending laterally therefrom. The flange H is in the form of a disk having an eccentrically placed opening and the coffee receiving vessel F is arranged in said opening so that the flange at one side is quite narrow but is constantly broadening until it reaches its greatest width at the diametrically opposite point. By means of the arrangement I am not only able to fit my percolator to various sizes of coffee pots but I am able to fit it to various sizes of coffee pots with hinged lids or covers, the narrow portion of flange being always arranged adjacent said lid while the broader portion of the flange normally projects over and covers the spout.

In operation the water distributer is first pushed up into the cylinder sleeve, the proper quantity of ground coffee introduced into the sleeve, the piece of gauze stretched across the open end thereof which is now held uppermost and the coffee receiving vessel is then fitted thereon and the percolator as a whole is then turned back to its proper position and inserted in the top of a coffee pot or other spouted vessel. A definite quantity of boiling water is then poured into the water receiving vessel A and inasmuch as this vessel has a single opening in the bottom thereof the passage of the water therefrom will be gradual and after passing through this opening it reaches the water distributer which serves to distribute the water evenly upon the ground coffee held upon the gauze and the boiling water thus distributed percolates through the coffee receiving vessel F and there accumulates until it reaches the level of the opening G through which it escapes down into the coffee pot proper. Any sediment which might be carried through the gauze will be caught in the coffee receiving vessel consequently the coffee which passes into the pot will be perfectly clear. It will be noted that the water comes in contact with the coffee only once, but being evenly distributed and passing slowly therethrough will extract all of the aroma and flavor from the coffee and deliver the product in a perfectly clear condition. Where a number of cups are desired a large quantity of ground coffee will be used and the proper proportion of water used and practical experience has demonstrated the fact that it requires substantially the same length of time for a small quantity of water say one cup to pass through the opening as for a larger quantity such as four cups or eight cups owing to the difference in pressure it being understood that when a considerable quantity of water is poured into the receptacle A there is a considerable pressure due to the weight of the water, whereas when a small quantity is poured in there is very little pressure owing to the lack of weight. The time required therefore for the water to pass through insures the extrication of all of the aroma and flavor from the ground coffee. It is only necessary to pour the water in at the top and the finished product is delivered to the coffee pot and this can be kept over a flame if so desired and the reheating will not materially effect it for the reason that none of the coffee grounds are in contact with the finished product.

It will thus be seen that I provide a coffee percolator capable of carrying out all of the objects hereinbefore referred to.

What I claim is:—

1. A coffee percolator comprising a water receiving receptacle having a single opening in the bottom thereof, a coffee receiving vessel having a single opening in the side thereof a definite distance above the bottom thereof of said vessel, coffee holding means interposed between said water receptacle and coffee receiving vessel, and a water distributer arranged within said coffee holding means, said water distributer having a perforated plate adapted to rest beneath and adjacent to the apertured bottom of the water receiving receptacle.

2. The combination with a coffee pot, of a disk adapted to rest thereupon and to project over and beyond the spout of the pot, said disk having an eccentrically arranged opening formed therein, a coffee receiving vessel carried by the underside of said disk and registering with said opening, said receptacle having a discharge opening in its side, means for holding ground coffee arranged in vertical alinement with the coffee receiving receptacle, and supported by said disk, and a water receiving receptacle carried thereby.

3. A device of the kind described comprising a water receiving receptacle having an opening in its bottom, a depending sleeve carried thereby, a second sleeve removably fitting in the first mentioned sleeve, a perforated distributer plate carried by the second sleeve, and intermediate its ends, a coffee receiving receptacle removably fitting on the first mentioned sleeve and having a side discharge, and a coffee holding fabric held in place by and between the coffee receiving receptacle and the first mentioned sleeve.

4. A device of the kind described comprising a coffee receiving vessel adapted to rest upon a coffee pot and discharging through its side, a water receiving vessel having a discharge opening in its bottom and a depending sleeve adapted to enter and be supported by said coffee receiving vessel, a coffee holding cloth retained in position between said sleeve and said vessel, and a perforated distributing plate arranged within said sleeve and spaced above said cloth.

BENJAMIN F. CHILDRESS.

Witnesses:
 ISAAC COALE, Jr.,
 HENRY G. BROWN.